United States Patent [19]
Hungerford, Jr.

[11] Patent Number: 4,714,218
[45] Date of Patent: Dec. 22, 1987

[54] HANGER FOR PIPE CLAMP

[76] Inventor: Charles S. Hungerford, Jr., 6 Beechwood Ct., Woodbury, Conn. 06798

[21] Appl. No.: 886,411

[22] Filed: Jul. 17, 1986

[51] Int. Cl.⁴ .............................................. F16L 3/02
[52] U.S. Cl. .................................... 248/62; 248/324; 248/60
[58] Field of Search ....................... 248/62, 60, 58, 63, 248/324, 323, 284, DIG. 9; 24/344

[56] References Cited

U.S. PATENT DOCUMENTS

| | | | |
|---|---|---|---|
| 2,267,431 | 12/1941 | Steensen | 248/60 |
| 2,563,749 | 8/1951 | Rose et al. | 238/324 X |
| 2,889,128 | 6/1959 | Martin et al. | 248/324 |
| 3,888,439 | 6/1975 | Tuttle | 248/62 |
| 4,004,768 | 1/1977 | Evans et al. | 248/60 X |
| 4,063,700 | 12/1977 | Brewer | 248/62 |
| 4,226,395 | 10/1980 | Bellinger | 248/DIG. 9 |
| 4,291,855 | 9/1981 | Schenkel et al. | 248/74.1 |
| 4,465,252 | 8/1984 | Donovan et al. | 248/60 |

Primary Examiner—Ramon O. Ramirez
Attorney, Agent, or Firm—Bachman & LaPointe

[57] ABSTRACT

The suspender device is operable to support a clamp in a variety of spaced rotational positions relative to the structure to which the device is secured.

10 Claims, 3 Drawing Figures

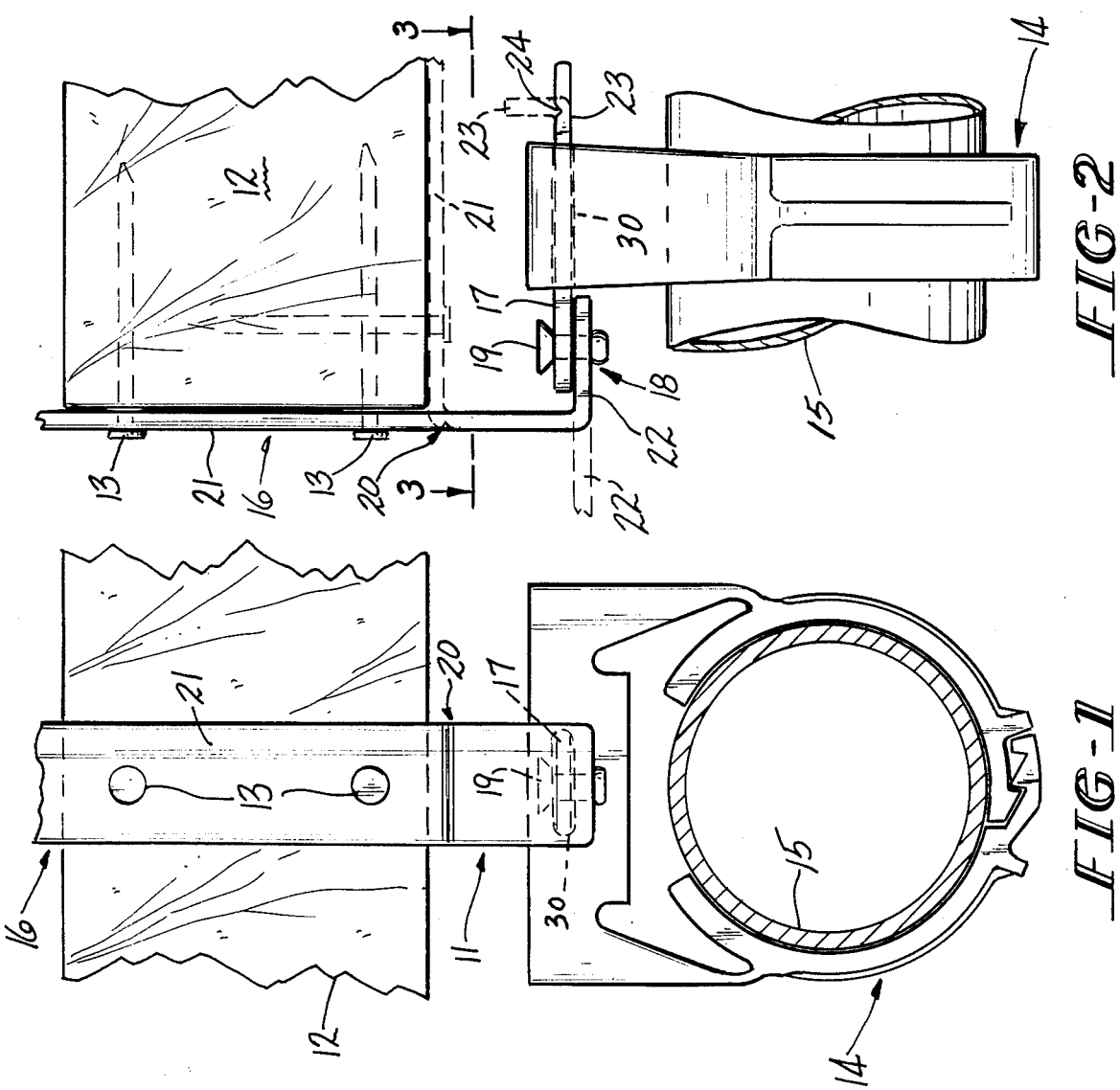

HANGER FOR PIPE CLAMP

BACKGROUND OF THE INVENTION

The present invention relates to hangers or suspender devices useful to connect pipes, conduits or cables to structural steel, concrete or wooden members.

In particular, the invention relates to hangers or suspenders which connect quick operating clamps to fixed structural elements.

A typical quick operating clamp useful to receive and support pipes, cables and conduits is disclosed and claimed in U.S. Pat. No. 4,291,855.

While clamps of this type have a reasonable amount of utility, they have certain limitations.

For example, it is difficult to connect the clamps of this class to various structural elements such as steel fabrications, masonry, concrete and wooden members.

In addition, such clamps frequently have limited flexibility as to rotational positions or general orientation relative to the structure to which it is desired to make a clamp connection while maintaining the proper alignment of the pipe cable or conduit supported by the clamp.

SUMMARY OF THE INVENTION

Consequently, it is a primary feature of the present invention to provide a hanger or suspender device useful to connect a clamp means such as a cable, conduit or pipe clamp to structural elements such as steel, masonry, concrete or wood operable to assume an infinite number of rotational positions as the structural elements require without interfering with the layout alignment or pattern of the cables, pipe or other conduit carried by the clamp means.

A further feature of the invention is the provision of a suspender which can be secured to structural elements by virtually any type of fastener such as screws, bolts, masonry nails, ordinary nails including fasteners driven by powder, air or hydraulically actuated tools.

A further feature of the invention is the provision of a suspender which is operable to assume at least two basic positions: a first position in which the suspender is rotatable through 180° and a second or reverse position which the suspender is rotatable through 180° to 360°.

It is to be understood that the clamp device disclosed in the said '855 patent is merely exemplary of clamps that can be connected to structural elements by the hanger or suspender device of the present invention. It is not intended that the present invention be limited to the '855 disclosure because obviously a wide variety of clamps, quick operating and conventional, are suitable to utilize the principles of the present invention.

A suspender or a hanger for supporting a clamp means such as a pipe, cable or other conduit clamp embracing certain principles of the present invention may comprise a strap means having at least two hinged strap elements, a first strap element having a fastener receiving region facilitating securing the strap means to a fixed support or structural element and a second strap element having a deformable tongue for engaging and supporting a clamp means, said first and second strap elements being rotatable relative to one another.

A combination embracing certain other principles of the present invention may comprise a clamp means and a suspender for securing the clamp means releasably and rotationally to a fixed structural member, said suspender having a first strap element for making a secure connection to said structural element and having a second strap element for engaging said clamp means.

The language "clamp means" as used herein is intended to denote clamps for carrying or supporting cables, pipes or other conduits and is not intended to be limited to quick operating clamps.

The language "structural elements" is intended to include steel, masonry, concrete or wooden fabrications.

Other features and advantages of the present invention will become more apparent from an examination of the succeeding specification when read in conjunction with the appended drawings, in which;

BRIEF DESCRIPTION OF THE DRAWINGS

FIG. 1 is a side elevation of the suspender or hanger of the present invention shown secured to a beam and carrying a pipe clamp.

FIG. 2 is an elevational view of the right side of FIG. 1.

FIG. 3 is a plan view of the illustration of FIG. 2 in the plane represented by the line 3—3 and as viewed in the direction of the arrows and rotated 90°.

DETAILED DESCRIPTION OF THE PREFERRED EMBODIMENT

Referring now in detail to the drawings, a suspender or hanger 11 is secured to a structural element 12 by nails, screws or other suitable fasteners 13 and carries or supports a clamp means 14 in turn carrying a pipe 15.

The hanger 11, which for purposes of claiming the invention is defined as strap means, includes a first strap element 16 hinged to a second strap element 17. The strap elements are hinged at 18 by a rivet or other suitable hinge pin 19.

The overall configuration of the strap means defines an L shaped configuration. In addition, the first strap element 16 has a first leg 21 and a second contiguous generally perpendicular leg 22.

The second strap element 17 is generally flat and terminates in a tongue 23 which is received within and projects through the clamp means 14.

The tongue is deformable from the solid line position of FIG. 2 to the dotted line position to keep the clamp means in place on the second strap element 17.

If desired the tongue 23 may be crimped or scored as at 24 to facilitate bending the tongue to its dotted line position.

Depending upon the configuration of the structural element to which the suspender is attached the leg 21 can be scored as at 20 in FIGS. 1 and 2 to facilitate bending the leg 21 as shown in dotted lines. Obviously a plurality of scores can be formed in the leg 21 at spaced intervals on either side of the leg 21 to facilitate bending the leg in a variety of configurations such as a Z or U shape to mate with the configuration of the structural element to which the suspender 11 is attached.

While it is preferable that the strap means be fabricated of metallic material it is within the spirit and scope of the invention to fabricate or mold the strap elements from moldable resins including resins reinforced by metal or fiberglass or like materials.

Note that the strap means can be secured to a structural element in the position shown in solid lines in FIG. 2 or it can be reversed to the dotted line position (shown partially).

As will become more apparent hereinafter, reversal of the first strap element permits the hanger to assure any desired rotational position through 360° as necessary to mate with the structural element to which it is affixed without interfering with the alignment or pattern of the cable pipe or conduit carried by the clamp means.

Referring to FIG. 3, it is apparent that the first and second strap elements are rotatable through 180° relative to one another and reversal of the first strap element 16 permits relative rotation through 180° through 360°.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. In combination, a support bracket and a pipe clamp, said bracket defining a pair of relatively movable strap means, a first strap means being operable to connect with a fixed support at a selected position, fastening means for effecting the connection between said first strap means and said fixed support at said selected position and a second strap means operable to engage releasably said pipe clamp whereby said pipe clamp can be spaced from said fixed support a distance which is a function of said selected position, said pipe clamp being operable in said spaced condition to engage said second strap means with freedom to assume a plurality of angular or rotational positions relative to said fixed support wherein the first strap means and the second strap means in the hinged condition define an L-shaped configuration, so that said pipe clamp when engaged by said second strap means is rotatable relative to said first strap means when said first strap means is secured to said fixed support through at least 180°.

2. The combination of claim 1 wherein the second strap means defines a deformable tongue.

3. The combination of claim 1 wherein the second strap means is received within and projects through said pipe clamp.

4. The combination of claim 2 in which the second strap means is received within and projects through said pipe clamp.

5. The combination of claim 4 in which the second strap means includes a weakened cross-section to facilitate deformation.

6. The combination of claim 5 in which the weakened cross-section defines a score line in the portion of the strap means which projects through said pipe clamp.

7. The combination of claim 4 in which the second strap means is received within a slot formed in the pipe clamp.

8. The suspender device of claim 1 in which the first strap means is formed with at least one score line to facilitate bending the strap means to mate with the configuration of the fixed support.

9. The combination of claim 3 in which the second strap means includes a weakened cross-section to facilitate deformation.

10. The combination of claim 9 in which the weakened cross-section defines a score line in the portion of the strap means which projects through said pipe clamp.

* * * * *